(12) United States Patent
Dincer et al.

(10) Patent No.: US 8,272,353 B2
(45) Date of Patent: Sep. 25, 2012

(54) APPARATUS FOR USING AMMONIA AS A SUSTAINABLE FUEL, REFRIGERANT AND NOX REDUCTION AGENT

(75) Inventors: Ibrahim Dincer, Whitby (CA); Calin Zamfirescu, Oshawa (CA)

(73) Assignee: University of Ontario Institute of Technology, Oshawa, Ontario (CA)

( * ) Notice: Subject to any disclaimer, the term of this patent is extended or adjusted under 35 U.S.C. 154(b) by 98 days.

(21) Appl. No.: 12/379,383

(22) Filed: Feb. 19, 2009

(65) Prior Publication Data

US 2011/0011354 A1 Jan. 20, 2011

Related U.S. Application Data

(60) Provisional application No. 61/064,133, filed on Feb. 19, 2008.

(51) Int. Cl.
F02B 43/00 (2006.01)
F02B 43/02 (2006.01)

(52) U.S. Cl. .............. 123/3; 123/1 A; 123/2; 123/198 A

(58) Field of Classification Search .................. 123/1 A, 123/2, 3, 198 A, 543
See application file for complete search history.

(56) References Cited

U.S. PATENT DOCUMENTS

| | | | |
|---|---|---|---|
| 2,140,254 A | 12/1938 | Zavka | |
| 2,559,814 A | 7/1951 | Whittle | |
| 2,578,193 A | 12/1951 | Marshall | |
| 2,979,681 A | 9/1976 | Arnold | |
| 4,223,642 A | 9/1980 | Okubo | |
| 4,478,177 A | 10/1984 | Valdespino | |
| 5,055,282 A | 10/1991 | Shikada | |
| 5,976,723 A | 11/1999 | Boffito | |
| 6,122,909 A * | 9/2000 | Murphy et al. | 60/286 |
| 6,804,950 B2 * | 10/2004 | Kong et al. | 60/275 |
| 7,157,166 B2 | 1/2007 | Vajo | |
| 2005/0274331 A1 * | 12/2005 | Eberspach | 123/3 |

* cited by examiner

*Primary Examiner* — Noah Kamen
*Assistant Examiner* — Grant Moubry
(74) *Attorney, Agent, or Firm* — Hill & Schumacher

(57) ABSTRACT

Embodiments are shown wherein ammonia is used for powering, heating and cooling of various applications including: vehicles (terrestrial, naval, aero-spatial or other engine-driven equipment), residential and commercial buildings, remote generators, refrigerated transport. An ammonia-fuelled internal combustion engine comprising; a thermally insulated fuel tank adapted to store ammonia; a heat exchangers operably connected to the fuel tank, wherein the heat exchanger is adapted to heat the ammonia; a decomposition and separation unit operably connected to the heat exchangers and having a hydrogen conduit and a nitrogen conduit, wherein the decomposition and separation unit is adapted to separate the heated ammonia into hydrogen and nitrogen and stream them into the hydrogen and nitrogen conduits respectively; and an internal combustion engine operably connected to the hydrogen conduit.

16 Claims, 9 Drawing Sheets

APPARATUS FOR USING AMMONIA AS A SUSTAINABLE FUEL, REFRIGERANT AND NOX REDUCTION AGENT

CROSS REFERENCE TO RELATED PATENT APPLICATION

This patent application relates to U.S. Provisional Patent Application Ser. No. 61/064,133 filed on Feb. 19, 2008 entitled METHODS AND APPARATUS FOR USING AMMONIA AS SUSTAINABLE FUEL, REFRIGERANT which is incorporated herein by reference in its entirety.

FIELD OF THE INVENTION

This invention relates to the use of ammonia and in particular the use of ammonia for powering, heating and cooling of various applications including: vehicles (terrestrial, naval, aero-spatial), residential and commercial buildings, remote generators, refrigerated transport or other mobile or stationary engine-driven equipment.

BACKGROUND OF THE INVENTION

Ammonia ($NH_3$), which has high content of hydrogen atoms per unit of volume, has been used occasionally in the past as a fuel for internal combustion engines and fuel cells. Ammonia appears to be an excellent hydrogen source and can play a crucial role in the hydrogen economy of the future.

Ammonia ($NH_3$) is about three times less expensive than hydrogen per volume of stored energy, and, similarly to hydrogen, it can be combusted in an environmentally benign way, exhausting only water and nitrogen. Moreover, the energy content of ammonia per unit of volume is comparable to that of gasoline which makes it a fuel attractive for transportation applications.

The idea of an ammonia-based economy in which fossil fuels are converted to ammonia and then used as a clean (synthetic) fuel in transportation and remote applications is important, due to the fact that ammonia production and consumption become $CO_2$ free.

Regarding the ammonia-fuel storage on-board of vehicles, in addition to the known storage in a pressurized liquid phase, ammonia can be absorbed in porous media like metal ammine complexes, e.g., hexaamminemagnesium chloride, $Mg(NH_3)_6 Cl_2$. The hexaamminemagnesium chloride is formed simply by passing ammonia over anhydrous magnesium chloride at room temperature and the absorption and desorption of ammonia is completely reversible. The ammine can be shaped in the desired form and can store 9% hydrogen per weight (9 kg $H_2$ in 100 kg) or 100 $kgH_2/m^3$. Another option is to combine ammonia with borane and form ammonia borane ($NH_3BH_3$) which is in the form of a powder under normal atmospheric conditions; by dissolving it in water ammonia borane emanates hydrogen and ammonia compounds.

Ammonia can fuel directly alkaline and solid oxide fuel-cells (SOFC) to produce steam and some NOx as exhausts; the NOx can be reduced by known methods. Moreover direct ammonia solid electrolyte fuel-cells were recently developed. For the ammonia use on-board of the PEM fuel-cell vehicles, the most cited option is the ammonia catalytic decomposition into nitrogen and hydrogen, reaction that is thermally driven by a 350° C. heat source. This heat can be obtained by catalytic combustion of a small part of the generated hydrogen. As an alternative option, hydrogen can also be obtained via ammonia electrolysis using a part of the electrical energy produced by the fuel cell.

Internal combustion engines (ICE) fuelled directly with ammonia must have special features because the ammonia's flame speed is slow. Some recent studies have demonstrated that homogeneous charge compression ignition (HCCI) technology may provide 40-50% efficiency for a large range of compression ratios, i.e., 40:1-100:1.

However, if decomposed even partially, ammonia can fuel regular internal combustion engines because the mixture of hydrogen, nitrogen, ammonia, and air has comparable combustion characteristics as gasoline. Furthermore, possibilities exist to separate the hydrogen from nitrogen after decomposition and thus to feed the cylinder with almost pure hydrogen; the combustion process is improved and NOx emission minimized in this way.

There are a series of patents regarding the use of ammonia as a fuel. An example is shown in U.S. Pat. No. 7,157,166 which refers to a direct ammonia fuel-cell system to generate electricity. The fuel-cell operates at high temperature and possesses a proton conducting membrane. Therefore there is no need of an afterburner like in the common solid oxide fuel-cells, because all protons of the ammonia molecules supplied at the anode can potentially diffuse through the membrane. The remaining gas at the anode is pure nitrogen, while the cathode exhausts steam and air (with less oxygen).

There are a series of patents regarding internal combustion engines with improved combustion that operate with a mixture of gasoline and ammonia. For example, in the solution proposed by U.S. Pat. No. 4,478,177 ammonia is stored on board in a liquefied phase. Using exhaust gases ammonia is evaporated and disintegrated and thereafter injected in the intake manifold. U.S. Pat. No. 2,559,814 presents an idea to cool the intake air with an ammonia spray that absorbs heat while vaporizing; this mixture is combined thereafter with gasoline for combustion. A similar patent is presented by U.S. Pat. No. 4,223,642. Injecting ammonia into diesel fuel is cited in the literature as a method of obtaining a cleaner combustion with improved efficiency and reducing wear and costs associated with maintenance.

There are some patents referring to ammonia cracking for hydrogen and nitrogen generation on vehicles and other applications. U.S. Pat. No. 5,976,723 investigates the catalytic cracking over various metals, while U.S. Pat. No. 5,055,282 focuses only on ruthenium catalyst. The idea of decomposing ammonia and fuelling internal combustion engines with the resulting hydrogen and nitrogen has been patented in 1938 by U.S. Pat. No. 2,140,254. In 1949 an ammonia decomposition unit that uses an electrical resistance to provide the decomposition heat, as illustrated in U.S. Pat. No. 2,578,193. The unit is connected to an ammonia bottle and exhausts a mixture of mainly nitrogen and hydrogen. The device is claimed to be so safe that it can be used at home, "even by the children", for filling balloons with light gas.

It has to be mentioned at this point that, using ammonia-fuel implies only regular and well known safety measures because it has a very narrow flammability range. If released into the atmosphere, ammonia's density is lighter than that of air and thus it dissipates rapidly. In addition, because of its characteristic smell the nose easily detects it in concentrations as low as ~5 ppm. For instance, U.S. Pat. No. 3,979,681 regards ammonia expansion and injection into the soil for agriculture applications, where ammonia is used as fertilizer. It is worth pointing out that in such common agricultural applications, some quantities of ammonia escape into the atmosphere; the practice demonstrates that the operators can cope easily with the danger associated with ammonia's toxicity in such conditions.

Ammonia is proposed as a refrigerant for vehicle air conditioning based on ammonia-water absorption refrigeration systems. The advantage of such a system is that there is no use of a compressor that would take large amount of useful shaft work of the engine. For providing cooling, only the exhaust gas heat is recovered.

Moreover, ammonia is proposed as a reduction agent of $NO_x$ emission of internal combustion engine. To this respect ammonia is stored on-board in various forms (urea, nitrogen monoxide, metal amines).

There is an unclassified US military application of ammonia as a fuel for small portable fuel-cells used by soldiers to power electrical equipments. There, ammonia is mentioned as safe hydrogen storage with no essential risks associated with the toxicity.

In the following text, some trials regarding the development of ammonia fuelled cars are mentioned. The first ammonia car was built in 1933 by the Fiat in Italy. The engine is adapted from a regular gasoline one, where the exhaust gases are passed through a heat exchanger that heats-up ammonia to the thermal decomposition temperature, i.e., approx 350-400° C. The resulting decomposition products (nitrogen, hydrogen and traces of ammonia) are mixed with air in a carburetor and thereafter fed into the cylinder.

There is a US-based company developing and testing ammonia cars, using alkaline fuel-cells with hydrogen obtained on-board from ammonia thermal cracking. The heat generated by the fuel-cell is recovered and used for ammonia decomposition. The car is equipped with a 60 kW fuel-cell and an ammonia fuel tank of 8.7 gallons and range up to 200 miles. There were initially some ammonia trucks tested in the USA in 1933 and some more recently in 2004, using a mixture of 80% ammonia and 20% gasoline.

SUMMARY OF THE INVENTION

The present invention relates to ammonia-fuelled systems for vehicular power and cooling generation, including a thermally insulated fuel tank adapted to store ammonia; a heat exchanger operably connected to the fuel tank, wherein the heat exchanger is adapted to heat the ammonia; a decomposition and separation unit operably connected to the heat exchangers and having a hydrogen conduit and a nitrogen conduit, wherein the decomposition and separation unit is adapted to separate the heated ammonia into hydrogen and nitrogen and stream them into the hydrogen and nitrogen conduits respectively; and an internal combustion engine operably connected to the hydrogen conduit.

In another embodiment there is provided an ammonia-fuelled hybrid system for propulsion, power, heating and air-conditioning having a generator with a homogeneous charge compression ignition, a linear piston carrying a rare earth magnet to induce an electrical current, and a transmission system, the hybrid system including: a thermally insulated fuel tank adapted to receive ammonia; a condenser operably connected to the fuel tank; an evaporator operably connected to the fuel tank, the condenser and the linear piston; and a selective catalytic reductor operably connected to the fuel tank and operably connected to the generator, wherein the selective catalytic reductor is adapted to combine ammonia with nitrogen to reduce the production of nitrogen oxides.

In a further embodiment there is provided an ammonia based fuel-cell system with combined power, heating and refrigeration including a thermally insulated fuel tank having an embedded coil therein, the fuel tank adapted to receive ammonia; a heater operably connected to the fuel tank; a fuel-cell operably connected to the heater; a turbo charger operably connected to the fuel-cell; and an electrical drive generator operably connected to the turbo charger.

Another embodiment shows an ammonia based cooling system including: a thermally insulated tank adapted to receive ammonia, whereby the tank contains ammonia liquid and ammonia vapour; and a cooling coil positioned in the tank in the ammonia liquid whereby the temperature and pressure in the tank have predetermined values.

Another embodiment shows an ammonia based cooling system including: a thermally insulated tank adapted to receive ammonia; a heat exchanger; and a throttling valve operably connected between the tank and the heat exchanger; whereby adjusting the throttling valve adjusts the evaporation temperature of the ammonia in the tank.

Another embodiment shows a fuelling system including: a decomposition and separation unit adapted to receive ammonia, and deliver hydrogen and nitrogen as separate streams; and a nitrogen expanding turbine operably connected to a heat recovery heat exchanger.

Another embodiment shows an ammonia fuelled internal combustion engine including: a thermally insulted fuel tank adapted to store ammonia; a mechanical refrigeration unit having a sub-cooler coil immersed in ammonia in the fuel tank; and an internal combustion engine operably connected to the fuel tank and the mechanical refrigeration unit.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The present push toward the development of hydrogen vehicles faces some major technological difficulties such as material and manufacturing related issues; storage of hydrogen requiring much more volume compared to conventional fuels (e.g., gasoline); proper production sources and technologies; huge costs associated with the development of a proper infrastructure, etc. We definitely need some key solutions for short-, mid- and long-term.

In embodiment shown herein there is proposed systems using ammonia as a fuel alternative to hydrogen which can overcome the hydrogen's economy obstacles because: (i) the energy volumetric density of ammonia is relatively close to that of gasoline, (ii) ammonia-driven power systems have potentially efficiencies comparable to hydrogen systems, (iii) the combination high-efficiency/high storage capacity lead to driving range/running time in the same order of the actual gasoline internal combustion engines, (iv) ammonia combustion is clean, exhausting only water and nitrogen, (v) ammonia fuel is an attractive economic alternative being cheaper than any other fuel, as will be demonstrated herein.

There are various ways of producing ammonia, ranging from chemical to biological and thermal to physical. Ammonia can be cheaply produced from syngas via the well established Haber-Bosh process. By reacting nitrogen and hydrogen ammonia is formed over catalysts and then separated at no cost via condensation. In general, the primary material to produce ammonia is methane, but any other fossil fuel or biomass can be used. Furthermore, ammonia can be produced in a biological way from manure and waste by special microorganisms. Moreover, ammonia can be produced from other renewable sources like wind or solar energy, and from high temperature waste heat.

As mentioned above, there are established technologies to use ammonia as a working fluid in power and refrigeration cycles, and there were some trials to use it as a fuel on transportation vehicles. However, we have not found in the open literature any disclosed application that simultaneously use both qualities of ammonia, i.e., as fuel and working fluid for refrigeration and power production, or as fuel, working fluid for refrigeration and power reduction and NOx reduction agent, as well as some novel subsystems to be mentioned later.

Figure 1:
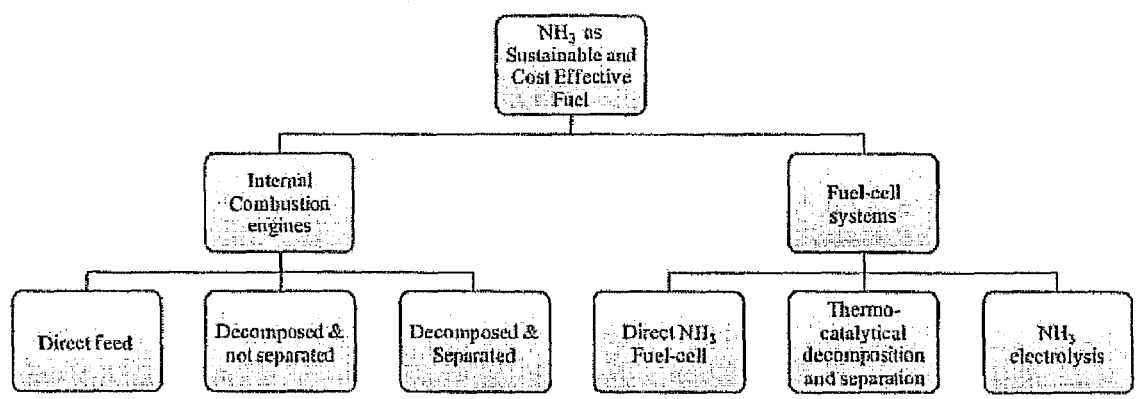
FIG. 1 is a flow chart showing the power, cooling and heating systems fuelled with ammonia of the present invention.

In the embodiments shown herein there is disclosed a number of ammonia fuelled systems for simultaneously zero emission power, heating and cooling with application to transportation vehicles (terrestrial—car, trucks, utilities, naval and aero-spatial), civil engineering and agricultural and other engine-driven equipment, remote generators, residential and commercial buildings, as shown in FIG. 1.

There are basically two approaches for ammonia-fuelled systems, i.e., either based on internal combustion engines (ICE) or on fuel-cells (FCs). In total there are shown six power generation methods: (i) direct feed of ammonia into an internal combustion engine, (ii) ammonia thermal cracking and feed of the products ($NH_3$, $H_2$ and $N_2$) all together in the ICE cylinder for combustion, (iii) separation of $N_2$ and $H_2$ streams simultaneously with the decomposition such that only pure $H_2$ is combusted; and the nitrogen is expanded for work production, (iv) direct ammonia high-temperature fuel-cell systems, (v) ammonia thermal cracking and separation and further using the hydrogen into high temperature fuel-cells, (vi) ammonia electrolysis and hydrogen used in proton exchange fuel-cells with additional exploitation of ammonia's refrigeration effect.

Figure 2:
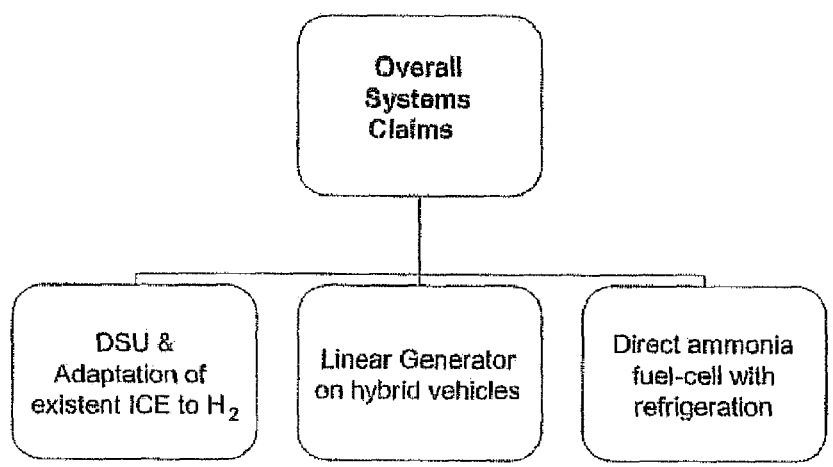
FIG. 2 is a flow chart showing the overall ammonia-fuelled systems for power, heating and cooling generation of the present invention.

Three integrated systems are shown, as summarized in FIG. 2. These systems will be described in the next section and are as follows: (i) a system using an ammonia decomposition and separation unit (DSU) to produce pure hydrogen that is used to drive an internal combustion engine adapted to $H_2$ as fuel; (ii) a hybrid system using a linear generator with homogeneous charge compression ignition (HCCI); and (iii) a direct ammonia high temperature fuel-cell system with refrigeration for air-conditioning as a by-product.

Figure 3:
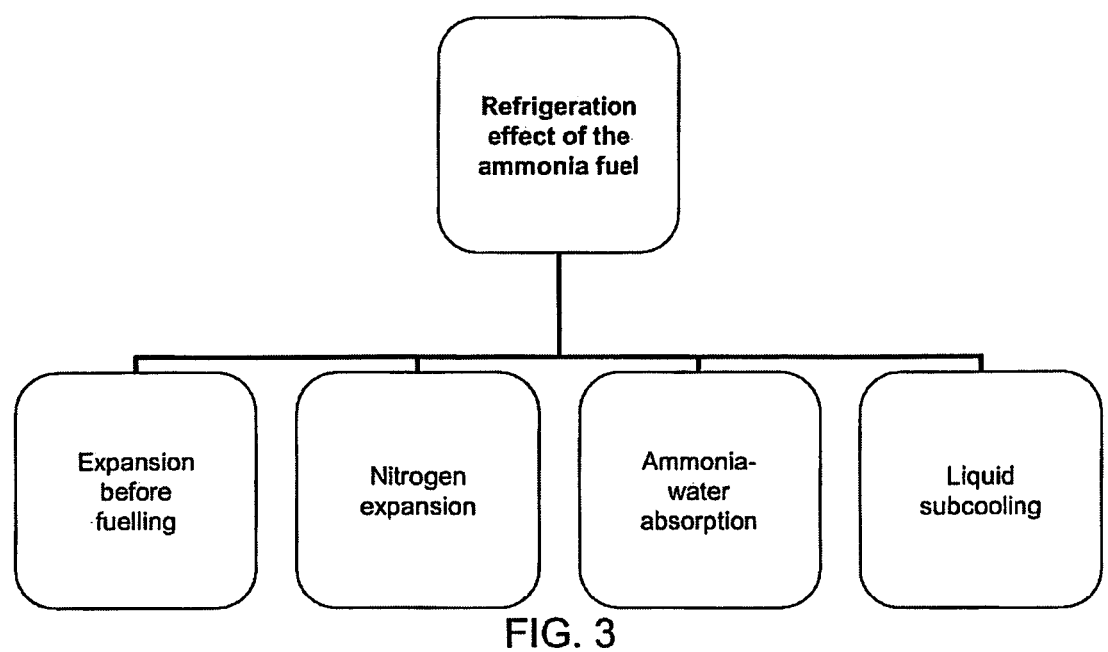
FIG. 3 is a flow chart showing systems for exploiting refrigeration effect on ammonia fuelled power generators of the present invention.

The embodiments also show several ways of exploiting the refrigeration effect of ammonia. There were identified four methods as summarized in FIG. 3: (i) prior to engine fuelling the ammonia is expanded from the tank at the desired temperature, and used in an evaporator to deliver the cooling effect; (ii) nitrogen is expanded to low temperatures, (iii) an ammonia-water absorption machine is used in combination with the method (i), and (iv) the cooling obtained by extraction ammonia-fuel in a vapor phase from the tank is used to sub-cool the liquid in a mechanical refrigeration cycle such that the coefficient of performance (COP) is improved.

In embodiments of the systems shown herein the system takes high energy density $NH_3$, splits it into constituent parts to provide fuel for an engine (ICE or Fuel Cell) and/or generates additional work or refrigeration effect. The waste heat from the system can be recovered to help maximize system efficiency.

Figure 4:
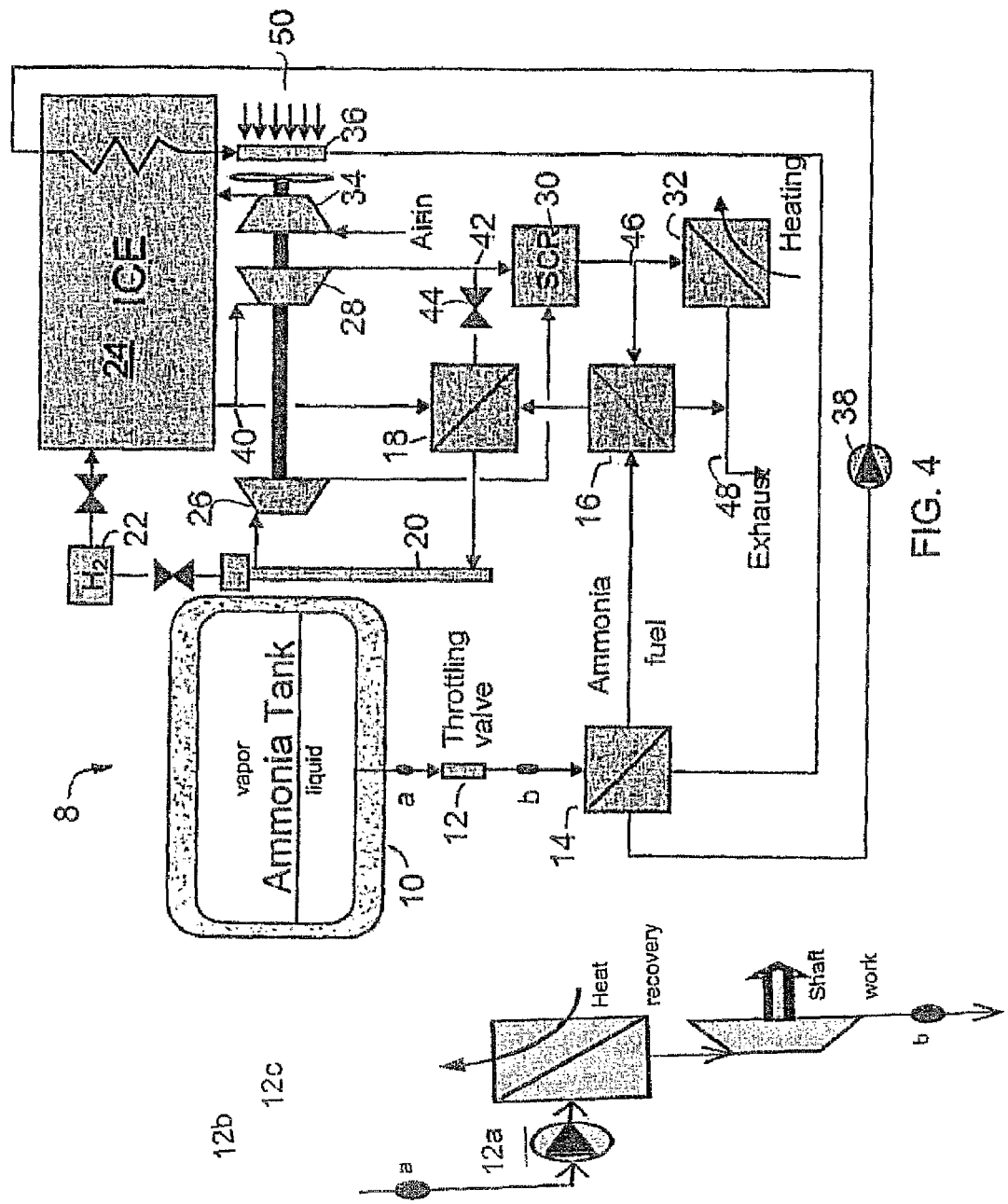
FIG. 4 is a schematic representation of an ICE with a system for decomposition and separation of $NH_3$ as fuel constructed in accordance with the present invention.

Referring to FIG. 4 a compact ammonia-fuelled power and heating system with internal cooling is shown generally at 8 and is developed for an internal combustion engine system. The ammonia-fuelled power and heating system with internal cooling 8 includes a thermally insulated ammonia tank 10, a modulated throttling valve 12, evaporator for indirect engine cooling 14, an ammonia pre-heater 16, an ammonia heater 18, an ammonia Decomposition and Separation Unit (DSU) 20, a hydrogen buffer 22, an adapted ICE with hydrogen injection system 24, a nitrogen turbine 26, an exhaust gas turbine 28, a selective catalytic reductor (SCR) for $NO_x$ reduction with ammonia, a heat recovery heat exchanger 32, a turbine driven fan 34, a downsized air-cooled heat exchanger 36, and a coolant circulation pump 38.

When under-pressure ammonia liquid fuel flows-out of the tank 10 the flow is throttled by the modulating valve 12 and its pressure is reduced. The obtained cooling effect is used in the evaporator 14 that cools the engine's coolant. In this way the air-cooler 36 can be downsized with direct implications in "savings" from the system's volume. The cost of the cooling system can also be reduced because the compact or downsized air-cooled heat exchanger 36 used in the proposed system is essentially cheaper than the finned surface radiator. The evaporated ammonia is preheated 16 to an intermediate temperature (~150-200° C.) and then further heated 18 with a part of the exhaust gases, up to the decomposition temperature (~350° C.). The evaporator 14, the ammonia preheater 16, the ammonia heater 18 and the heat recovery heat exchanger 32 are all heat exchangers that are compact plate heat exchangers and are well insulated thermally.

The heated ammonia is fed into the DSU 20 where it splits and separates in one stream of hydrogen and one stream of nitrogen. The hydrogen is directed toward a small hydrogen buffer 22 useful for the engine start-up and from there is fed into the ICE 24. The nitrogen is expanded into the turbine 26 and directed toward the SCR 30. The expanded nitrogen will contain small traces of ammonia that are used in the SCR 30 to reduce the amounts of nitrogen oxides produced by the combustion process.

The combustion products exhausted from the ICE 24 at outlet 40 are split in two flows: one is directed to the turbocharger 28 placed on the same shaft with the turbine 26 and the fan 34, while the other is directed toward the heater 18. The two streams are joined thereafter at 42 using a pressure reduction valve 44. The resulting stream, containing $NO_x$, is directed toward the SCR 30.

After the SCR 30 the $NO_x$-free hot gases are split into two flows at 46, from which one is used to preheat the ammonia in the ammonia preheater heat exchanger 16, and the other can be optionally used for any heating purposes in the heat recovery heat exchanger 32, e.g., for air heating in the cabin. The two streams merge then on the same exhaust pipe 48.

The fan 34 blows the outside air 50 over the air-cooled heat exchanger 36 that cools the hot coolant in a first step. A second step of cooling is performed in the evaporator 14. The coolant is re-circulated by the pump 38 and delivered at its lowest temperature to the ICE's cooling network.

The system described above with regard to FIG. 4 includes a number of claimed technical novelties as follows:

Ammonia extracted from the tank is first expanded to produce refrigeration effect that cools the engine and then ammonia is consumed as a source of hydrogen. In this way the air-cooled heat exchanger is downsized and some fan power is saved. This leads to a reduction of initial and operating costs since the finned heat exchanger 36 is downsized and hence the investment cost is also reduced.

Ammonia is decomposed and separated in a stream of almost pure hydrogen and a stream of almost pure nitrogen, whereas the hydrogen is heed as fuel into the internal combustion engine and the nitrogen is eventually exhausted in atmosphere as a benign gas. An advantage of this option is that no additional nitrogen is injected into cylinder rather it that comes from air and a clean combustion with very low $NO_x$ formation is facilitated. As well, the stream of nitrogen can be expanded for work and heat recovery and the additional work obtained by nitrogen expansion is used to drive the fan 34.

Some traces of ammonia present in nitrogen are used in the selective catalytic reductor (SCR 30) to reduce the $NO_x$ produced by hydrogen combustion with air.

A small buffer of hydrogen is used for start-up purposes. During the start-up, hydrogen is consumed from the buffer and, after the entire system warms-up, the recovered heat is used for ammonia decomposition and re-filling the buffer. A small metal hydride hydrogen cylinder may be used as buffer.

The system described in FIG. 4 may also include a variation as indicated in the figure, between points a and b. Over there, the valve 12 can be replaced with an assembly formed three elements operably connected in series, namely, the ammonia pump 12*a*, the heat exchanger 12*b* and the turbine 12*c*. Liquid ammonia extracted from the tank 10 at point a is pumped to high pressure by the pump 12*a*, and the heated to superheated vapors with heat recovered from the ICE 24 in the heat exchanger 12*b*. The superheated ammonia vapor at high pressure are expanded in the turbine 12*c* and discharged in point b at a refrigeration temperature to serve further for cooling in the evaporator 14. The shaft work obtained at the turbine 12*c* can serve any useful purpose on-board (e.g., driving an alternator, a fan or it can be coupled to the power-train to drive the wheels).

Figure 5:
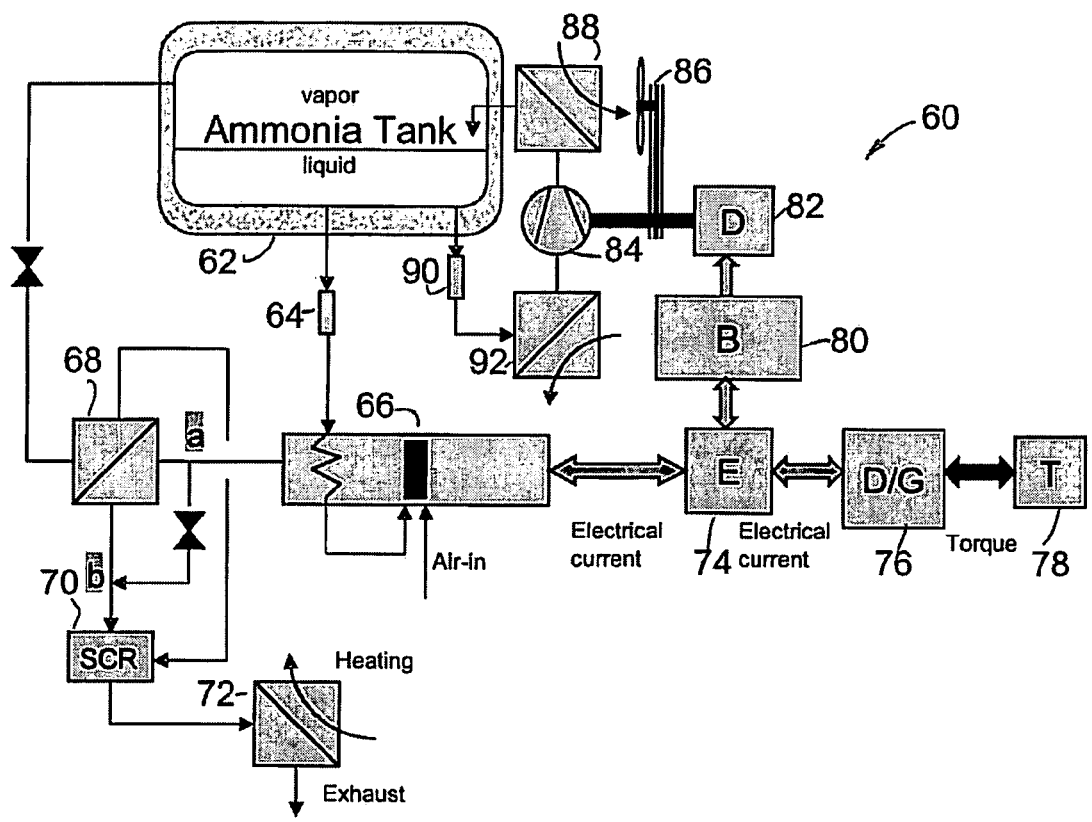
FIG. 5 is a schematic representation of a hybrid ammonia-fuelled powertrain with HCCI linear generator and high coefficient of performance air-conditioning system constructed in accordance with the present invention.

FIG. 5 shows a hybrid system 60 for propulsion, power, heating and cooling equipped with a linear generator with homogeneous charge compression ignition (HCCI) that has a reciprocating piston carrying a rare earth (permanent) magnet to induce an electrical current in the coil spooled at the outer surface. The generator is fuelled directly with ammonia. The system 60 includes a thermally insulated ammonia tank 62, a throttling valve 64, a linear generator (based on HCCI Otto-type internal combustion engine) 66, an ammonia pre-heater 68 for $NO_x$ reduction flow, a selective catalytic reductor 70, a heat recovery heat exchanger 72, an electronic block 74, a drive/generator 76, a transmission system 78, an electrical accumulator (battery) 80, an air-conditioning drive 82, an ammonia compressor 84, a fan/blower 86, an air-cooled condenser 88, a throttling valve 90, and an evaporator 92.

Prior to fuelling the linear generator 66 the ammonia is throttled and cooled such that it serves as a coolant of the HCCI internal combustion engine 66. The engine 66 is of a special construction; its principle is not claimed here. The engine includes a cylindrical tube, and has at the outer side cooling channels while at the inner side the heat generating combustion process occurs. Ammonia evaporates in the cooling channels and is superheated, then mixed with air and admitted into the cylinder.

The piston of the engine 66 contains rare earth magnets such that by its linear/alternating movements it generates an electrical current into a coil spooled at the outer side of the cylinder. The reverse process is also possible, i.e., by circulating an alternative current through the coil, a left-right movement of the piston is induced. This is the case during the start-up, when the energy stored in the battery 80 is used via the electrical block 74 to compress the combustible gases in order to initiate the combustion. The construction of the HCCI linear generator has the advantage that it combines two systems in one: an ICE and an electrical generator; thus resulting in a more compact construction. Furthermore, compression ratio can be adapted to the actual operating conditions by adjusting the piston displacement via an induced electro-mechanical force.

The $NO_x$ contained in the exhaust gas is reduced in the selective catalytic reductor 70 using small quantities of ammonia taken from the tank 62 and preheated in the pre-heater heat exchanger 68. The clean exhaust gases can be cooled down to a temperature close to the ambient (water can be condensed) and their heat recovered for heating purposes. The electronics block 74 controls the system operation by relating the linear generator 66 with the electrical drive/generator 76 and the electrical accumulator/battery (and/or electrical condenser) 80. The transmission system 78 can produce or consume torque, depending on the actual driving situation.

The system is equipped with a high COP air-conditioning system that takes advantage of ammonia-fuel existent on-board. Its compressor 84 and blower 86 are driven by the compact electrical drive 82. The air-cooled condenser 88 discharges into the fuel tank 62. From there ammonia liquid is taken, throttled in valve 90, and delivered to the evaporator 92.

There are a number of advantages realized by the system shown in FIG. 5. Specifically, by using the refrigeration effect felt in the ammonia tank 62 when ammonia is taken out of the system to be consumed into the internal combustion engine drive allows for the downsizing of the condenser 88 of the ammonia refrigeration unit. Further, the ammonia present in the fuel tank, can be used directly for $NO_x$ reduction. There is no need of urea stored on board or other means to store the ammonia. The system 60 shown in FIG. 5 can easily be applied to various types of vehicles. Also the air conditioning system requires reduced maintenance, due to the fact that leakage problem becomes of less importance since the refrigerant is the fuel at the same time, and refilled as required.

Figure 6:
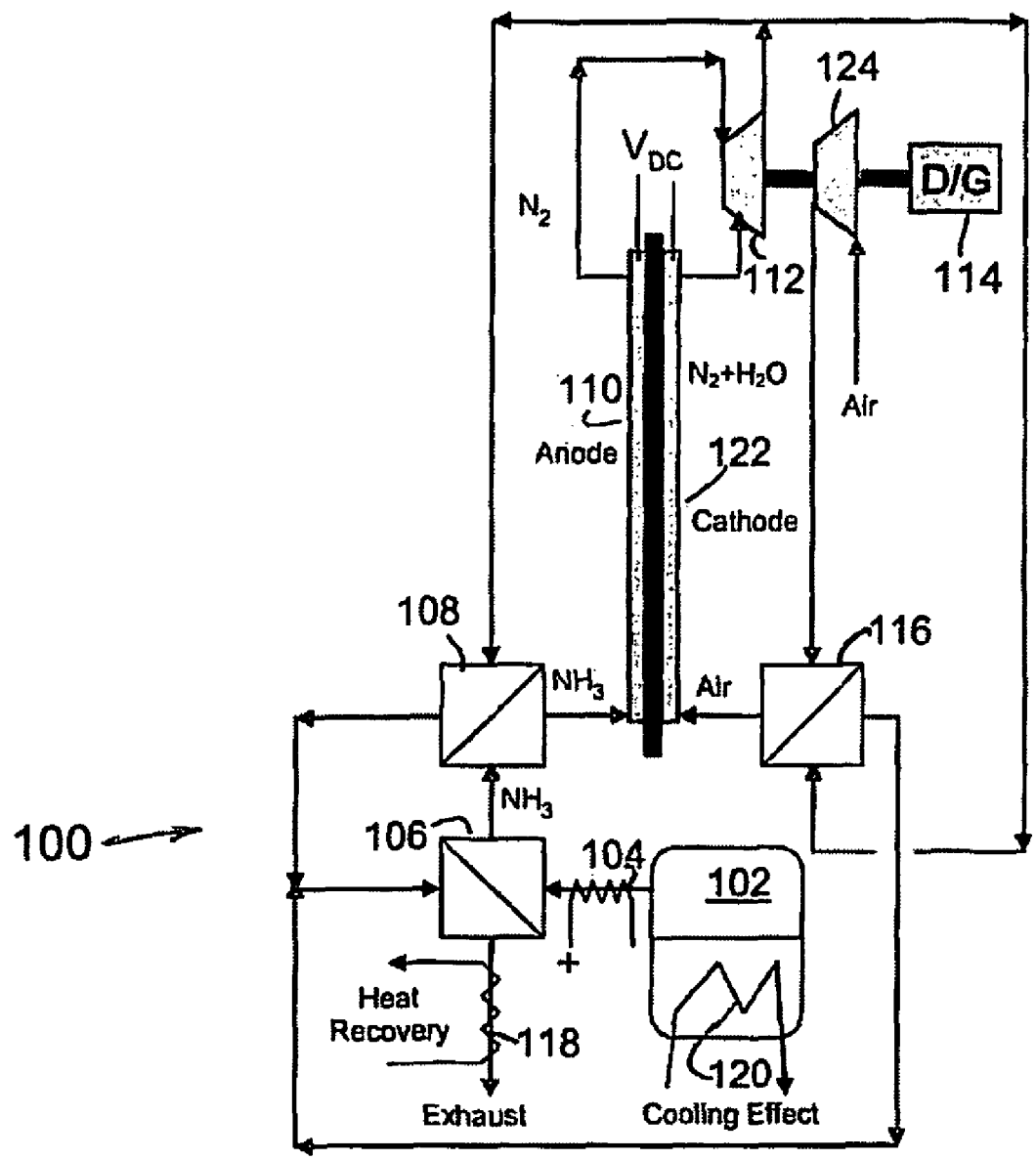
FIG. 6 is a schematic representation of an ammonia-fuelled proton-conducting solid oxide membrane fuel-cell system constructed in accordance with the present invention.

An ammonia based fuel-cell system with combined power, heating and refrigeration is shown generally at 100 in FIG. 6. The core of the system is represented by an ammonia-fuelled proton-conducting solid-oxide-membrane fuel-cell that operates at high temperatures in the range of 500 to 1000° C., respectively. The ammonia based fuel cell system 100 includes thermally insulated ammonia tank 102 with embedded coil 120, a DC current electrical pre-heater 104 of ammonia, an ammonia pre-heater 106, an ammonia heater 108, a proton-conducting solid oxide fuel-cell 110, a turbo-charger 112, an electrical drive/generator 114, an air heater 116, a heat recovery heat exchanger 118, and an air conditioning coil 120 embedded in the tank 102.

At the system start-up the drive 114 is supplied by the electrical battery (not shown) and it starts circulating the air through the fuel-cell 110. At the same time, ammonia is heated by the electrical coil 104 to the decomposition temperature (300-400° C.) and delivered to the fuel-cell 110, where it thermo-catalytically decomposes into hydrogen and nitrogen.

The protons formed by the external polarization diffuse through the membrane and reach the cathode 122, where water formation reaction occurs. Due to this fact, the temperature of the fuel-cell stack increases and so does the temperature of the exhausted nitrogen and air. The exhausted gases are expanded into the turbine of the turbo-charger 112 that produces enough work to drive the turbo charger 124, and in addition to that to produce some electrical current by driving the generator 114.

After the start-up period the ammonia stream and the air stream are heated with the exhaust gases in the ammonia pre-heater 106, ammonia heater 108, and heat recovery 118 heat exchangers respectively, such that the electrical heater or electrical coil 104 may be switched-off.

The exhaust gases, containing no substantially $NO_x$, substantially no $CO_2$, but substantially containing only nitrogen, oxygen and steam, are further cooled to a temperature close to the ambient temperature, with heat recovery in the heat recovery heat exchanger 118. The heat recovered may be used for any heating purposes.

In addition to heating, a cooling effect is obtained into the coil 120 embedded into the tank 102. The cooling is due to the high vapor enthalpy that leaves the tank while supplying the fuel-cell. If not needed, the cooling effect is wasted, but in any case is present in the system. If no other refrigeration effect is needed, one option is to cool the airstream delivered to the inlet section of compressor in order to reduce the compression work and hence improve the system overall efficiency.

The proposed system as shown in the third embodiment can be used either for vehicles, or for portable power generators, or for residential or office heating, cooling and power.

Figure 7:
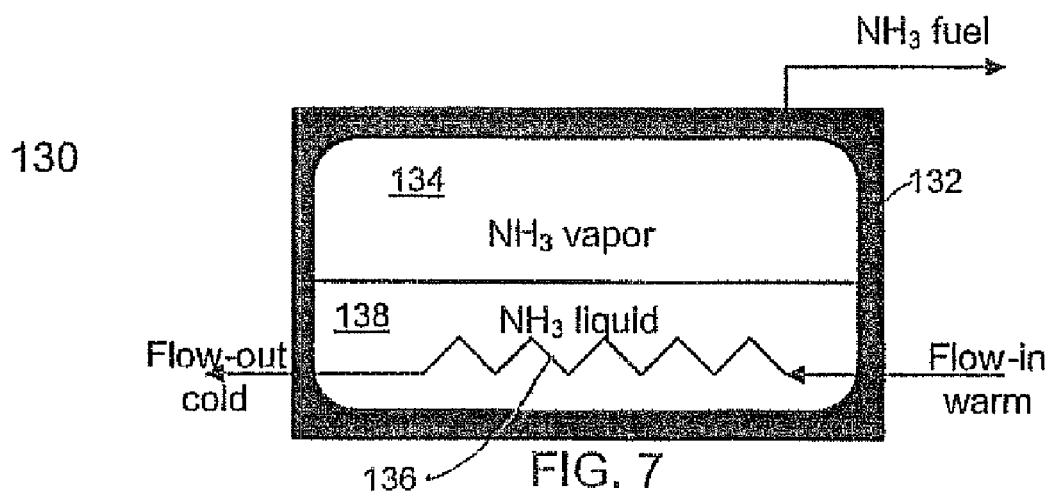
FIG. 7 is a schematic representation of a sketch system using an ammonia cooling principle shown in the present invention.

Referring to FIG. 7, a method for cooling 130 is shown wherein ammonia is extracted from a tank 132, either for fuelling an engine or for any other purposes.

Storing liquid ammonia on-board has an important advantage that should not be neglected: as it has been suggested above it can be used for cooling needs. In order to explain this effect, assume that ammonia vapor 134 is extracted from the pressurized tank 132 at a certain temperature. While leaving the tank the vapor takes out their flow enthalpy. This enthalpy is replaced by evaporation of the corresponding quantity of liquid. Both the temperature and the pressure in the tank decrease in this way. If a cooling coil 136 is embedded into the liquid 138, as illustrated in FIG. 7, then the temperature and pressure in the tank can be stabilized at a desired value. In this way the cooling effect induced by the ammonia vapors extracted from the tank is exploited. Insulating the tank thermally will help reduce heat gain.

To give an example, if one assumes the temperature in the tank at T=15° C., the specific enthalpy of the vapor in this condition is 1.62 MJ/kg which represents 7.2% from the HHV of ammonia. The tank is well thermally insulated. If liquid instead of vapor is extracted from the tank in the same conditions the corresponding amount of refrigeration will represent 1% from HHV. This means that for a 70 kW engine 1 kW of cooling is obtained if liquid is extracted from the tank, or 5 kW cooling is obtained if vapor is extracted instead. It has to be mentioned that the simplicity of this air conditioning system lowers both initial, operational and maintenance costs by elimination of the usual mechanical air-conditioning system and reducing the maintenance.

Figure 8:
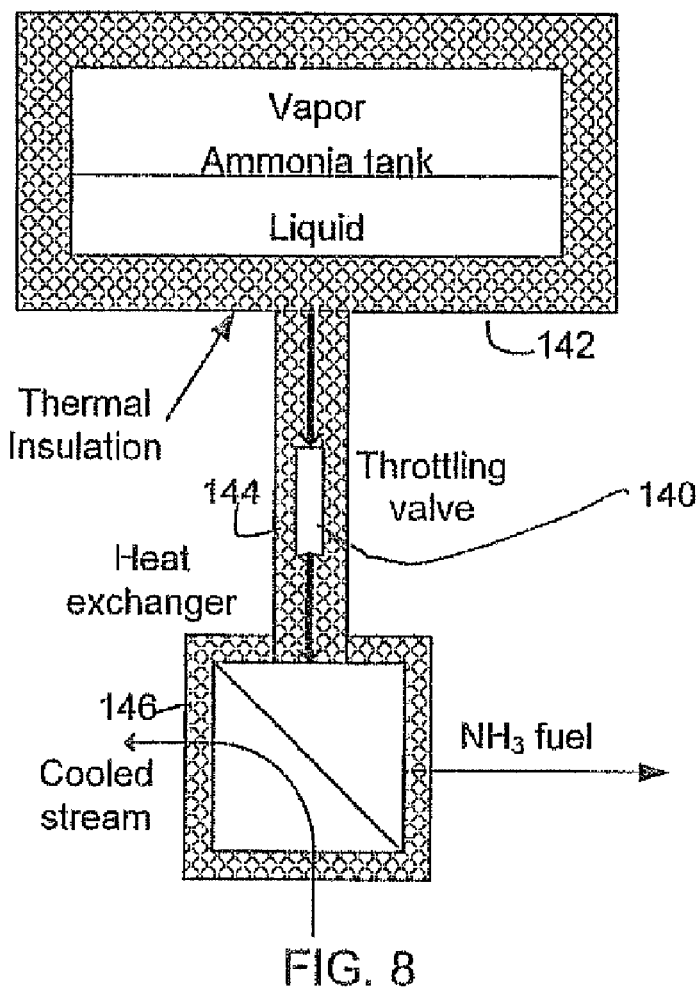
FIG. 8 is a schematic representation of an ammonia fuelling system with simultaneous refrigeration effect constructed in accordance with the present invention.

An alternative cooling method 140 is shown in FIG. 8, and consists of a fuel tank 142, a valve 144 and a heat exchanger 146, all embedded in thermal insulation, as shown in FIG. 8. While fuelling the engine, the temperature in the tank 142 drops until thermal equilibrium with the hot stream is achieved. The role of the throttling valve 144 is to adjust the evaporation temperature. If the throttling valve 144 is completely open, there is no important pressure difference between the tank 142 and the generator; therefore the evaporation temperature is the same as the tank temperature. If some throttling is applied the temperature is lowered.

This system allows for simple, non-mechanical refrigeration and potentially can reduce both the investment and operation costs. The investment cost is reduced by downsizing or eliminating the compressor and the condenser of a mechanical cooling system. The,operating cost is reduced by diminishing the work needed to drive the compressor, and eliminating the maintenance related to the leakages of refrigerant from the system. The system can be applied for engine cooling and/or for air-conditioning, and/or for other cooling needs depending on the application or any combination thereof.

Figure 9:
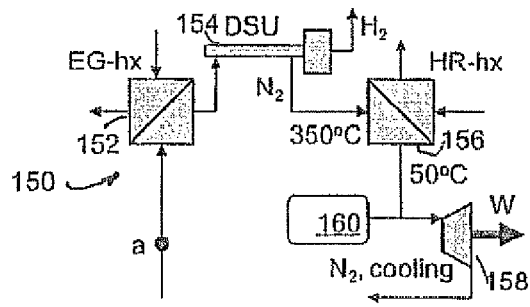
FIG. 9 is a schematic representation of a fuelling system with ammonia decomposition and separation as well as nitrogen storage constructed in accordance with the present invention.

A fuelling system 150 with decomposition and separation of ammonia is shown in FIG. 9, and it includes an exhaust gas heat exchanger (EG-hx) 152, a decomposition and separation unit (DSU) 154, a heat recovery heat exchanger (HR-hx) 156, a nitrogen expanding turbine 158 and a nitrogen buffer 160. The ammonia fuel is fed in a gaseous phase and heated to the decomposition temperature (approx. 350° C.) by exhaust gases. Ammonia is thereafter cracked over a catalytic membrane permeable only to hydrogen. Several types of commercially available $H_2$-selective membranes (e.g., polymeric, metallic, carbon or ceramic-based, etc) can be applied. Optionally, nitrogen selective membranes may be included in the system to improve the DSU efficiency. The system 150 is operably connected upstream (in point a) with an ammonia expanding system, similar to the ones illustrated in the assembly from FIG. 4, that is, either with a throttling valve 12, or with the expanding system 12a-12b-12c.

Figure 10:
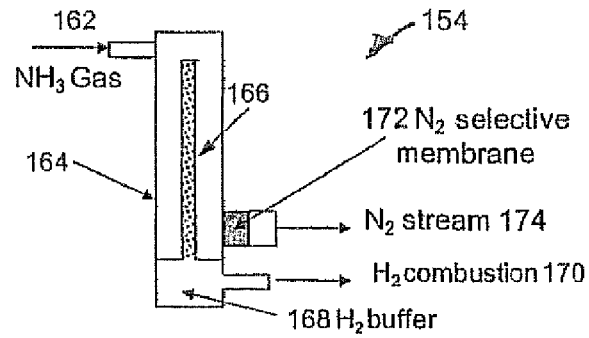
FIG. 10 is a detailed schematic representation of the decomposition and separation unit shown in FIG. 9

A detailed sketch of the DSU 154 is shown in FIG. 10. Ammonia 162 is fed from one side of the DSU 154 and flows in the space between the outer shell 164 and the catalytic membrane 166. The catalytic membrane contains noble metals known as ammonia decomposition catalysts (e.g., vanadium). Note that if the decomposition heat is available at higher temperature (e.g., over 500-600° C.) cheap catalysts as iron may also be used. Ammonia 162 is decomposed thermocatalytically at the surface of the membrane 166. The formed hydrogen molecules permeate through the hydrogen selective membrane 166, are collected in the buffer 168 and directed toward the hydrogen outlet port 170. Because nitrogen and hydrogen are continuously drained out of the DSU 154, the reaction equilibrium shifts toward ammonia decomposition. Some traces of ammonia may exist in the streams of hydrogen and especially nitrogen 174. If the case requires, a nitrogen permeable membrane 172 may be optionally inserted in the nitrogen collecting conduit. Nitrogen selective membranes where considered in other applications, e.g., separating $N_2$ from atmospheric air.

The resulting stream of hydrogen is fed into the engine, while the stream of nitrogen is cooled with heat recovery to temperatures close to ambient. The resulting stream is thereafter expanded in a turbine for work production. The expansion process produces a cold stream of nitrogen that can be used for refrigeration. If refrigeration is not needed, the nitrogen is stored at high pressure in the buffer 168. If stored nitrogen exists in the buffer 168, a refrigeration effect with work recovery can be then obtained even if the engine does not run, or runs at low power.

Alternatively, the stream of nitrogen can be expanded directly after exiting the DSU. The expansion takes place until a pressure slightly superior to the atmosphere. The resulting gas will have a temperature over 150° C. This heat can be recovered in a subsequent heat exchanger.

The advantage of the system is that a pure hydrogen stream is obtained, to be used further in a combustion process with negligible $NO_x$ emissions. Moreover, the almost pure stream of nitrogen can be expanded with heat and work recovery and then exhausted in the atmosphere without any harmful effect.

Figure 11:
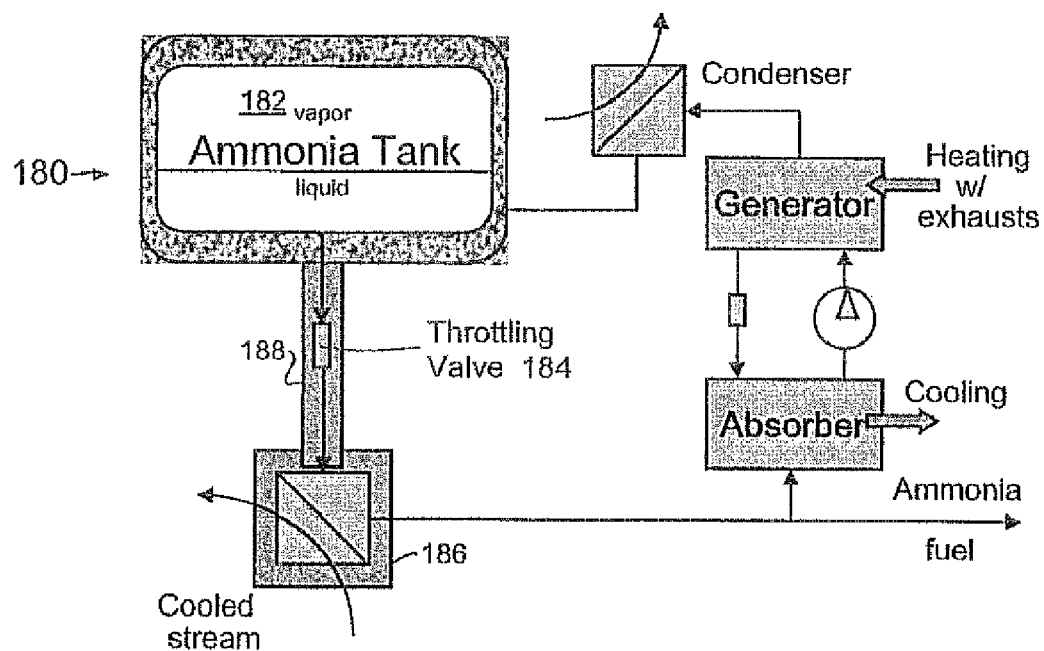
FIG. 11 is a schematic representation of a system using exhaust gases to drive an ammonia-water absorption cooling system and upgrade the refrigeration effect due to ammonia-fuel consumption constructed in accordance with the present invention.

A system for fuelling a work and heat producing ammonia engine (e.g., ICE or high temperature fuel-cell) that combines the system shown in FIG. 4 with an ammonia-water absorption refrigerator is shown generally at 180 in FIG. 11.

In some applications there is a need of simultaneous power and refrigeration. For example in refrigerated trucks the power in the low temperature storage space is needed for running air circulating devices, lights or other elements. For such cases, a part of the heat generated on-board may be used to run an absorption refrigeration system. As illustrated in FIG. 11, system 180 includes an insulated ammonia fuel tank 182, a throttling valve 184 and evaporator 186. The peculiarity of the system consists in the fact that only a part of the generated ammonia vapors are re-circulated while the rest are consumed by the combustion process. The re-circulated vapors are firstly absorbed in water and the rich solution is then pumped to high pressures and delivered into the generator. There, the solution receives heat from exhaust gases and high purity ammonia vapors are generated. The vapors are condensed in an air-cooled condenser and the resulted liquid returned to the ammonia tank. The evaporator 186, the valve 184, the tank 182 and the connecting line 188 are insulated to reduce any heat gains.

Figure 12:
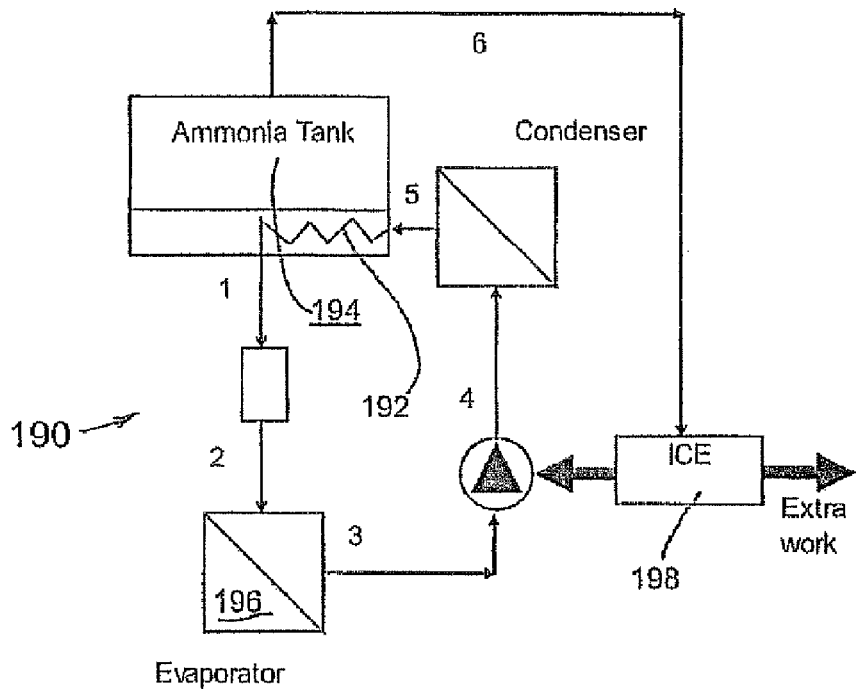
FIG. 12 is a schematic representation of a system using improved efficiency of a refrigerator by applying sub-cooling obtained from ammonia consumption by the ICE driving the compressor constructed in accordance with the present invention.

Referring to FIG. 12, a system based on ammonia-fuelled ICE for simultaneous power, heating and cooling is shown generally at 190. The system 190 includes a mechanical refrigeration unit that has a sub-cooler coil 192 immersed in an ammonia fuel tank 194. Optionally, the coil 192 may be replaced with an additional heat exchanger for ammonia sub-cooling. The compressor 196 is driven by an ICE 198 fuelled by ammonia. The refrigeration effect from ammonia vapor leaving the tank 196 is used for the sub-cooling process. An improved COP of the refrigerator is obtained in this way. The work generated by the ICE 198 can be used only to drive the compressor 196, or additional work can be generated to drive utilities, a power generator, or for propulsion.

The system can be applied either for refrigerated trucks or railway cars, for air-conditioned vehicles, or for residential power, cooling and heating. Heating is recovered from the exhaust gases.

The systems described above and summarized in FIG. 1 may be modified in a number of ways. In ammonia fuelled system that include a linear generator of the type described above in regard to FIG. 2, such systems may use the ammonia's cooling effect in any of the methods or systems presented herein. Further, any ammonia fuelled system that includes an internal combustion engine and an ammonia decomposition unit, that does not separate the hydrogen from nitrogen, but rather feeds the ICE with a mixture of nitrogen, hydrogen and ammonia, and makes use of the ammonia's cooling effect in any of the methods or systems presented herein (hydrogen boosts the ammonia combustion). Any ammonia fuelled system similar to the one described above may be modified such that ammonia is decomposed and the nitrogen and hydrogen are separated. A direct ammonia fuel-cell system that makes use of the ammonia's cooling effect in any of the methods or systems is presented herein. A fuel-cell system that uses ammonia as primary fuel is also presented, where ammonia is decomposed and separated, and only pure hydrogen is fed into the fuel-cell; the cooling effect of ammonia is exploited via any of the methods claimed herein. An ammonia-fuelled system that decomposes ammonia via electrolysis is also presented to obtain pure hydrogen and use it in any kind of fuel-cell; the system makes at the same time use of the refrigeration effect of the ammonia or/and nitrogen through any of the methods or systems presented herein.

The most relevant features of the main fuels together with the ammonia's characteristics are summarized in Table 1. The higher heating value (HHV) is indicated to cope with the current trend toward cleaner fuels that can be exhausted at lower temperature.

Table 1 lists the fuel and the type of storage in the first column, followed by the fuel pressure in the tank, the fuel density in the full tank (except for gasoline and methanol where the density refers to the liquid itself). Other listed characteristics are the higher heating value, the energy density, the specific volumetric cost (given with respect to the internal volume of the tank), and the specific energetic cost (given in terms of cost per unit of energy).

It is interesting to remark that the cost of energy in the form of ammonia is only 13.3 $/GJ as compared to 38.3 $/GJ for compressed natural gas (CNG) which contains mostly methane. Note that methane is the rough material to produce ammonia in industry. This aspect is explained by the large costs associated with methane's onboard storage in compressed state.

TABLE 1

Comparison of ammonia with other fuels and hydrogen.

| Fuel/Storage | P [bar] | Density [kg/m3] | HHV [MJ/kg] | Energy Density [GJ/m3] | Specific volumetric cost [$/m3] | Specific energetic Cost [$/GJ] |
|---|---|---|---|---|---|---|
| Gasoline, C8H18/Liquid tank | 1 | 736 | 46.7 | 34.4 | 1000 | 29.1 |
| CNG, CH4/Integrated Storage System | 250 | 188 | 55.5 | 10.4 | 400 | 38.3 |
| LPG, C3H8/Presurized tank | 14 | 388 | 48.9 | 19.0 | 542 | 28.5 |
| Metanol, CH3OH/Liquid tank | 1 | 749 | 15.2 | 11.4 | 693 | 60.9 |
| Hydrogen, H2/Methal hydrides | 14 | 25 | 142 | 3.6 | 125 | 35.2 |
| Hydrogen(*)/NH3 pressurized tank | 10 | 603 | 25.0 | 15.1 | 181 | 12.0 |
| Ammonia/Pressurized tank | 10 | 603 | 22.5 | 13.6 | 181 | 13.3 |
| Ammonia, NH3/Metal amines | 1 | 610 | 17.1 | 10.4 | 183 | 17.5 |

CNG—compressed natural gas, LPG—liquefied petroleum gas
(*)reformed from ammonia In Table 1 we also included the option of hydrogen reformed on-board from ammonia, by thermo-catalytic cracking using the DSU. In this scenario, the heat generated by the engine is recovered and used for ammonia reforming to hydrogen. In this case, the energy density of ammonia is upgraded from 22.5 to 25 MJ/kg and from 13.6 to 15.1 GJ/m$^3$, a fact that leads to specific cost reduction from 13.2 $/GJ (ammonia) to 12 $/GJ (hydrogen reformed from ammonia). The data in the table demonstrate that using ammonia as fuel (either directly or by on-board reforming to hydrogen) is the most advantageous amongst all common options.

One may see a drawback for ammonia presence in the passenger vehicles due to its toxicity. In a car crash, it may spill around and become harmful to living species. This obstacle can be overcome by innovative ways of ammonia storage. One possibility is to embed ammonia in metal amines, as mentioned in the introduction. Doing so, the danger of toxicity is completely eliminated because ammonia can be released only by heating the porous media at 350° C. or more. The energetic drawback of this system comes from the energy needed for ammonia release that leads to a cost increase to 17.5 $/GJ.

Figure 13:
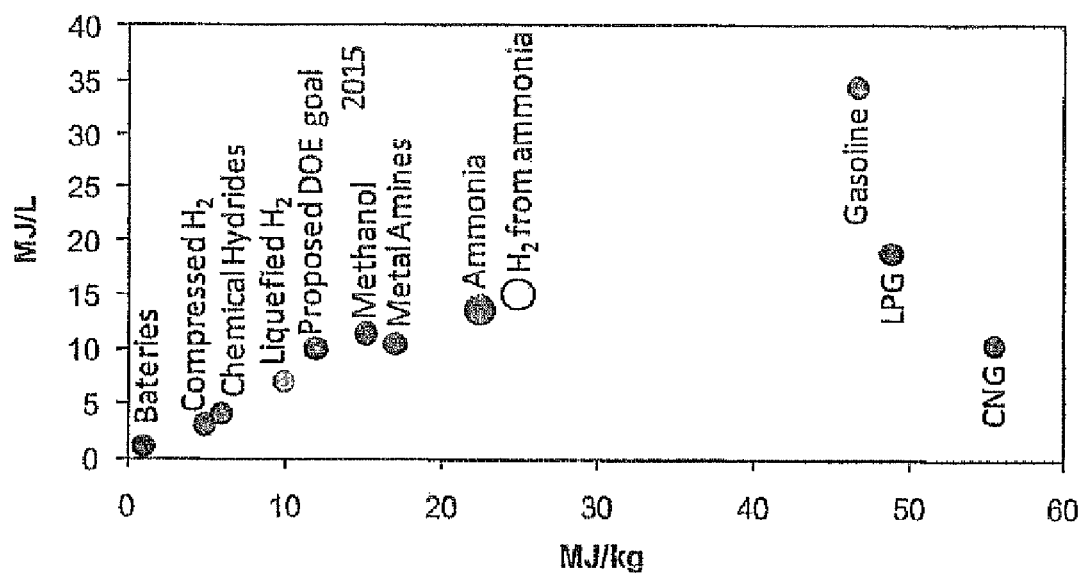
FIG. 13 is a graph showing volumetric energy density vs gravimetric density of various fuels.
Figure 14:
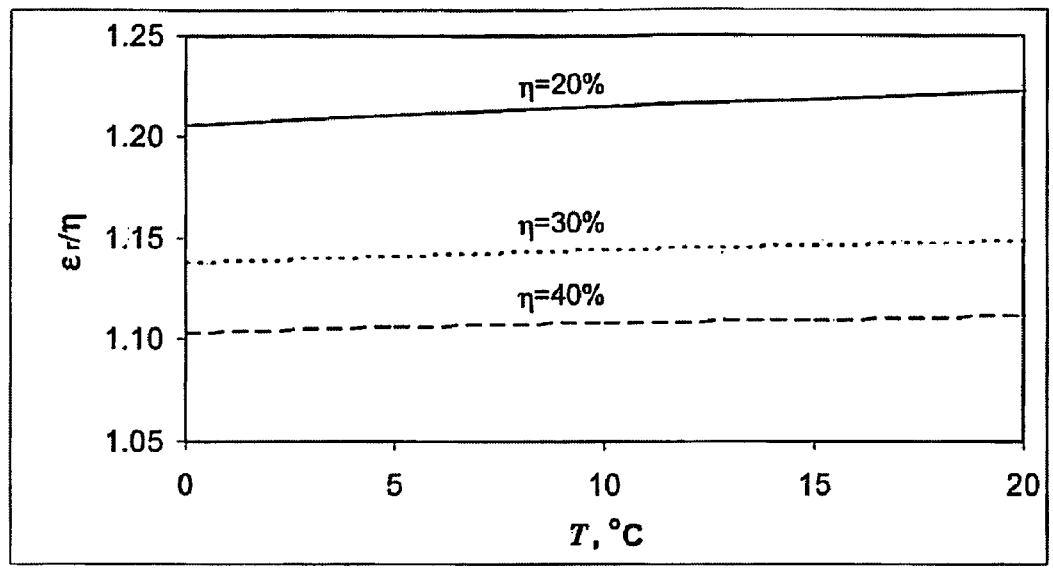
FIG. 14 is a graph showing increase of the engine effectiveness due to the refrigeration effect of ammonia, at different evaporating temperatures.

The results presented in Table 1 are summarized graphically in FIG. 13 which illustrates the volumetric energy density vs the gravimetric energy density stored on-board on various fuels.

The six approaches mentioned in conjunction with FIG. 1 are compared in Table 2 in terms of effectiveness, cost of driving and driving range, assuming that all of the systems are used for vehicle transportation applications. The effectiveness is defined such that it quantifies the existence of the cooling effect and work recovery effect from the expansion gases (where it is possible), as follows:

$$\varepsilon_r = \varepsilon + \frac{\varepsilon_c}{COP} + \varepsilon_w$$

where the subscript c refers to the cooling power and w refers to work recovery. In the table the effectiveness is estimated based on higher heating value of ammonia, and assuming a COP of 2, which is typical for automotive industry. An indicator of 0.5 MJ/km shaft work to drive a medium size car has been used for calculating the data.

TABLE 2

Performance of ammonia power systems and of other systems.

| Fuel/System | $\varepsilon_r$ % | $/100 km | Range, km |
|---|---|---|---|
| Gasoline/ICE | 24% | 6.06 | 825 |
| CNG/ICE | 28% | 6.84 | 292 |
| LPG/ICE | 28% | 5.10 | 531 |
| Methanol/Reforming + Fuel Cell | 33% | 9.22 | 376 |
| H2 Metal hydrides/Fuel Cell | 40% | 4.40 | 142 |
| NH$_3$/Direct ICE | 44% | 1.57 | 592 |
| NH$_3$/Thermal Decomposition ICE | 28% | 2.38 | 380 |
| NH$_3$/Thermal Decomposition & Separation ICE | 31% | 2.15 | 420 |
| NH$_3$/Direct FC | 44% | 1.52 | 597 |
| NH$_3$/Thermal Decomposition & Separation Fuel Cell | 46% | 1.45 | 624 |
| NH$_3$/Electrolysis | 20% | 3.33 | 271 |

The other fuels indicated include gasoline, compressed natural gas (CNG), liquefied petroleum gas (LPG), methanol (on a methanol reforming fuel-cell system), and hydrogen (on a fuel-cell system).

It is of interest to assess the impact of the refrigeration effect on the effectiveness of the ammonia engine in function of the ammonia's saturation temperature T in the fuel tank. A practical range for T is 0-20° C. In FIG. 5 it is reported the quantity $\varepsilon_r(T)/\eta$ for three efficiencies of the ammonia engine. The result reveals that the engine's effectiveness is superior with 10-20% to the efficiency, due to the presence of ammonia refrigeration.

It is interesting and important to assess the effect and performance of converting a real hydrogen car to ammonia. Here it is considered as an example for a H$_2$ICE Ford Focus. The real performance of the H$_2$ICE and its calculated ammonia counterpart are presented in Table 3. It is assumed that the powertrain behaves similar in the both cases, i.e., needs 1.19 MJ/100 km, and that the ammonia system do not use mechanical refrigeration, but rather it makes use of the cooling effect of the on-board ammonia.

TABLE 3

Comparison of H$_2$-ICE with NH$_3$-ICE.

| Parameter | H$_2$-ICE | NH$_3$-ICE |
|---|---|---|
| Storage tank volume (L) | 217 | 76 |
| Storage pressure (bar) | 345 | 10 |
| Energy on-board (MJ) | 710 | 1025 |
| Cost of full tank (CN$) | 25 | 14 |
| Driving range (km) | 298 | 430 |

TABLE 3-continued

Comparison of $H_2$-ICE with $NH_3$-ICE.

| Parameter | $H_2$-ICE | $NH_3$-ICE |
|---|---|---|
| Driving cost (CN$/100 km) | 8.4 | 3.2 |
| Tank Compactness (L/100 km) | 73 | 18 |

Note:
the engine considered in the analysis was Ford $H_2$ICE. The actual data from manufacturer were listed for $H_2$-ICE and the calculations were done for $NH_3$-ICE.

Figure 15:
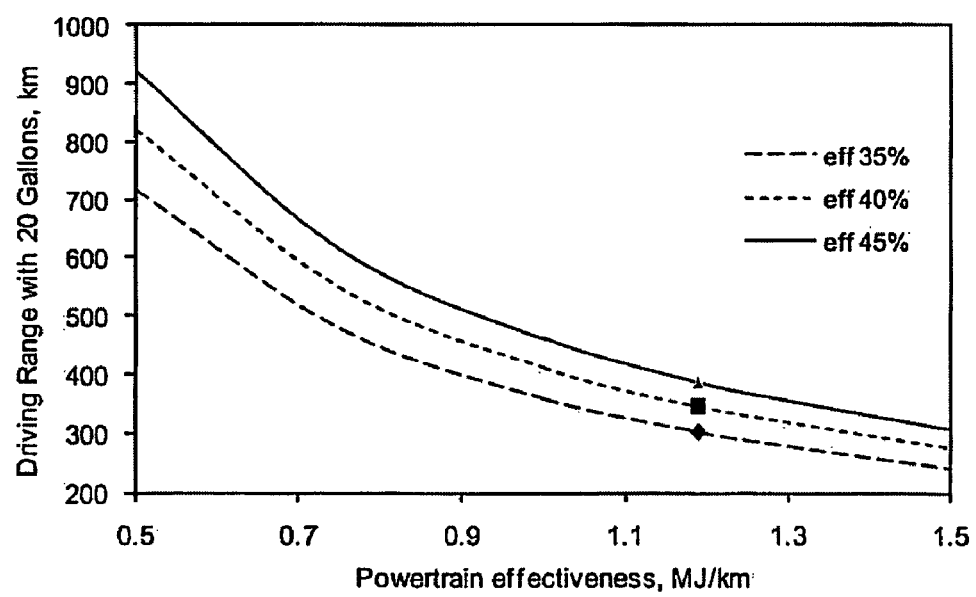
FIG. 15 is a graph showing the estimated driving range of a hybrid hydrogen-fuelled Ford Focus converted to ammonia as fuel.

The influence of the powertrain performance on the driving range for various ammonia engine assumed efficiencies is illustrated in FIG. 15. The chart demonstrates that, due to the qualities of the ammonia-fuel essentially larger driving ranges may be obtained and at a cheaper cost, in comparison with the reference hydrogen case.

The embodiments described above show both at the system level and at the subsystem level ammonia-fuelled systems for various types of applications, but with a special emphasis on vehicular applications. These systems are discussed and some compelling results are presented to compare with other types of fuels and applications to provide the clear advantages of these systems and subsystems.

Accordingly, the use of ammonia in ICEs and fuel-cells as a sustainable fuel as well as for hydrogen production for fuel-cells and compared with other conventional fuels (gasoline, compressed natural gas (CNG), liquefied petroleum gas (LPG), methanol) as well as with hydrogen presents some key advantages from the points of energy storage density per unit of volume and of mass, and the unitary cost per unit of storage tank volume, etc. It is also shown that using ammonia simultaneously as a refrigerant fuel is a viable option. A performance investigation of the above options is performed for comparison purposes through thermal efficiency and effectiveness, along with a study of some additional parameters, such as driving range and cost associated with 100 km driving range, for ammonia-fuelled alternatives vs systems powered with other fuels. Here are some concluding remarks as drawn from the embodiments shown herein:

Ammonia is the least expensive fuels in terms of $/GJ.
In terms of $GJ/m^3$ ammonia is the third, after gasoline and LPG.
There is an advantage of by-product refrigeration of 7.2% from HHV, which reduces the investment and maintenance costs.
The driving range selected is reasonably long.
It is the cheapest fuel per 100 km driving range.
Some additional advantages of ammonia are commercial availability and viability, global distribution network, easy handling experience, etc.
The drawback may be its toxicity as it requires some potential solutions implemented.

Nomenclature

| COP | coefficient of performance |
|---|---|
| T | temperature, ° C. |

Greek Letters

| ε | effectiveness |
|---|---|
| η | efficiency |

Subscripts

| c | cooling effect |
|---|---|
| r | refrigeration effect |
| s | isentropic |
| w | work recovered |

Generally, the systems described herein are directed to the use of ammonia in fuelled systems. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to ammonia.

As used herein, the terms "comprises" and "comprising" are to construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. An ammonia-fuelled power and heating system comprising; a thermally insulated fuel tank adapted to store ammonia; a heat exchanger operably connected to the fuel tank, wherein the heat exchanger is adapted to heat the ammonia; a decomposition and separation unit operably connected to the heat exchanger and having a hydrogen conduit and a nitrogen conduit, wherein the decomposition and separation unit is adapted to separate the heated ammonia into hydrogen and nitrogen and stream them into the hydrogen and nitrogen conduits respectively; and an internal combustion engine operably connected to the hydrogen conduit.

2. The ammonia-fuelled power and heating system as claimed in claim 1 wherein the heat exchanger is a first heat exchanger and further including a plurality of heat exchangers operably connected together in series adapted to heat the ammonia in stages.

3. The ammonia-fuelled power and heating system as claimed in claim 2 wherein the plurality of heat exchangers include an evaporator operably connected to a preheater and a heater operably connected to the preheater.

4. The ammonia-fuelled power and heating system as claimed in claim 3 wherein the plurality of heat exchangers are well insulated compact plate heat exchangers.

5. The ammonia-fuelled power and heating system as claimed in claim 3 wherein the power and heating system includes an air-cooler and wherein the evaporator is operably connected to the air-cooler of the power and heating system whereby the evaporator has a cooling effect and the cooling effect from the evaporator cools the air-cooler of the power and heating system.

6. The ammonia-fuelled power and heating system as claimed in claim 3 and further including a turbine operably connected to the nitrogen conduit and a selective catalytic reductor operably connected to the turbine wherein the selective catalytic reductor is adapted to combine ammonia with nitrogen to reduce the production of nitrogen oxides.

7. The ammonia-fuelled power and heating system as claimed in claim 6 wherein the internal combustion engine has an exhaust and further including a first and second conduit operably connected to the exhaust of the internal combustion engine, the first conduit is operably connected to a turbo-charger and the second conduit is operably connected to the heater, the turbo-charger is operably connected to the selective catalytic reductor and the heater is operably connected to the selective catalytic reductor.

8. The ammonia-fuelled power and heating system as claimed in claim 6 wherein the selective catalytic reductor is operably connected to the preheater.

9. The ammonia-fuelled power and heating system as claimed in claim 6 wherein the turbine, a fan and a nitrogen turbine are all connected to a single drive shaft and wherein the nitrogen turbine is operably connected to the nitrogen conduit of the decomposition and separation unit and the fan operates to cool a radiator of the internal combustion engine.

10. The ammonia-fuelled power and heating system as claimed in claim 1 wherein the decomposition and separation unit includes a catalytic membrane permeable to hydrogen.

11. The ammonia-fuelled power and heating system as claimed in claim 10 wherein the decomposition and separation unit further includes a nitrogen permeable membrane.

12. The ammonia-fuelled power and heating system as claimed in claim 6 wherein the decomposition and separation unit includes a catalytic membrane permeable to hydrogen.

13. The ammonia-fuelled power and heating system as claimed in claim 12 wherein the decomposition and separation unit further includes a nitrogen permeable membrane.

14. The ammonia-fuelled power and heating system as claimed in claim 1 wherein the fuel tank includes an ammonia expanding system formed from one of a throttling valve and from three elements operably connected in series, namely an ammonia pump, a heat exchanger that superheats the ammonia stream and a turbine that expands the superheated ammonia vapour and produce useful shaft work.

15. The ammonia-fuelled power and heating system as claimed in claim 6 wherein the fuel tank includes an ammonia expanding system formed from one of a throttling valve and from three elements operably connected in series, namely an ammonia pump, a heat exchanger that superheats the ammonia stream and a turbine that expands the superheated ammonia vapour and produce useful shaft work.

16. The ammonia-fuelled power and heating system as claimed in claim 10 wherein the fuel tank includes an ammonia expanding system formed from one of a throttling valve and from three elements operably connected in series, namely an ammonia pump, a heat exchanger that superheats the ammonia stream and a turbine that expands the superheated ammonia vapour and produce useful shaft work.

* * * * *